(12) United States Patent
Strong

(10) Patent No.: US 7,809,337 B2
(45) Date of Patent: Oct. 5, 2010

(54) SYSTEM AND METHOD FOR ADJUSTING TRANSMISSION PHASING IN A POINT-TO-POINT COMMUNICATION LINK

(75) Inventor: Peter N. Strong, Ipplepen (GB)

(73) Assignee: Motorola, Inc., Schaumburg, IL (US)

( * ) Notice: Subject to any disclaimer, the term of this patent is extended or adjusted under 35 U.S.C. 154(b) by 771 days.

(21) Appl. No.: 11/678,679

(22) Filed: Feb. 26, 2007

(65) Prior Publication Data

US 2007/0222677 A1    Sep. 27, 2007

Related U.S. Application Data

(60) Provisional application No. 60/778,572, filed on Mar. 2, 2006.

(51) Int. Cl.
*H04B 1/00* (2006.01)
(52) U.S. Cl. ............. 455/69; 370/335; 370/342; 370/441; 370/208; 370/320; 370/331; 370/376; 370/515; 370/516; 370/517; 342/367; 701/213; 375/362; 375/365; 375/367
(58) Field of Classification Search .......... 455/69; 370/335, 342, 441, 208, 200, 320, 331, 276, 370/515–517; 342/367, 357.12, 357.06; 701/213; 375/200, 206, 209–210, 362, 365, 375/367
See application file for complete search history.

(56) References Cited

U.S. PATENT DOCUMENTS

| | | | | |
|---|---|---|---|---|
| 5,943,331 | A * | 8/1999 | Lavean | 370/335 |
| 6,031,487 | A * | 2/2000 | Mickelson | 342/357.12 |
| 7,430,257 | B1 * | 9/2008 | Shattil | 375/347 |
| 7,593,449 | B2 * | 9/2009 | Shattil | 375/130 |
| 2007/0211786 | A1 * | 9/2007 | Shattil | 375/141 |
| 2007/0222677 | A1 * | 9/2007 | Strong | 342/367 |

FOREIGN PATENT DOCUMENTS

| | | |
|---|---|---|
| EP | 1079543 A | 2/2001 |
| EP | 1359684 A | 11/2003 |
| EP | 1478105 A1 | 11/2004 |

OTHER PUBLICATIONS

Ye Li, et al. "Transmitter Diversity for OFDM Systems and Its Impact on High-Rate Data Wireless Networks", IEEE Journal on Selected Areas in Communications, IEEE Service Center, Piscataway, USA; vol. 17, No. 7, Jul. 1999; XP011054988; ISSN:0733-8716.
PCT Search Report Dated Jun. 1, 2007.

* cited by examiner

*Primary Examiner*—Matthew D Anderson
*Assistant Examiner*—April G Gonzales
(74) *Attorney, Agent, or Firm*—Anthony P. Curtis

(57) ABSTRACT

An apparatus and method for adjusting transmission phasing in a point-to-point communication link is disclosed. The relative phases of the transmissions from each antenna are adjusted before transmission to give optimum gain when received by two or more antenna elements and a signal combining element. The signal includes a data component, consisting of a subset of the subcarriers modulated with the input data, which is common to transmissions from all antenna elements; and a phase reference component consisting of a subset of the subcarriers that are modulated with a predetermined phase. The signal combining element is operable to receive the components and extract phase information. A phase adjustment signaling device compares extracted phase information and signals the plurality of transmitting antenna elements to adjust the relative transmission phasing between the signals transmitted from a plurality of transmitting antenna elements to permit a receiver to receive the transmitted signals with a desired phase relationship.

10 Claims, 5 Drawing Sheets

SYSTEM AND METHOD FOR ADJUSTING TRANSMISSION PHASING IN A POINT-TO-POINT COMMUNICATION LINK

REFERENCE(S) TO RELATED APPLICATION(S)

The present application claims priority from provisional application Ser. No. 60/778,572 entitled "SYSTEM AND METHOD FOR ADJUSTING TRANSMISSION PHASING IN A POINT-TO-POINT COMMUNICATION LINK," filed Mar. 2, 2006, which is commonly owned and incorporated herein by reference in its entirety.

FIELD OF THE INVENTION

The present invention relates to a method and apparatus for implementing a point-to-point Orthogonal Frequency Division Multiplexed (OFDM) radio communications link and a system incorporating the same.

BACKGROUND OF THE INVENTION

A conventional point to point radio system is shown in FIG. 1. Typically transmission is between antennas mounted on two towers, Tower 1 and Tower 2. Each tower has two antennas mounted one above the other. The upper antenna is used to transmit and receive signals, but the lower antenna is conventionally used for receive only. The purpose of the lower receive antenna is to provide diversity, i.e. an alternative signal path which may be selected should the link between the two upper antennas fade due to the propagation characteristics of the atmosphere.

The height above the ground of the upper antenna is selected to minimize obstructions in the first Fresnel zone (referred to hereafter as the Fresnel zone). The Fresnel zone is the region in which obstructions may cause signal loss. Signals traveling from one antenna to the other within the Fresnel zone will arrive with a phase difference between 0 and 90 degrees relative to the line of sight phase, unless reflections from obstructions occur. Typically 20% of the Fresnel zone may be obstructed without significant signal loss. As shown in FIG. 1, the curvature of the earth's surface needs to be taken into account when assessing the intrusion of obstructions into the Fresnel zone. Due to the variation of the density of the atmosphere with elevation, and hence variation of the dielectric constant, radio waves will tend to follow a curved path, so that the apparent curvature of the earth will vary with atmospheric conditions. The apparent radius of the earth typically has a value of 4/3 r for a 50 km link, where r is the geometric radius of the earth. However the apparent radius can fall to as little as 0.8 r for a small percentage of the time, which has the effect of increasing the apparent height of obstructions. Typically the height of the upper antennas is chosen so that obstructions will not cause significant loss in any expected atmospheric conditions.

The height above the ground of the second antenna is a tradeoff between the need to provide sufficient spacing from the upper antenna to provide diversity and the minimization of obstructions to the Fresnel zone. Typically, the lower antenna is sited such that the obstruction of the Fresnel zone is not sufficient to cause significant loss in normal atmospheric conditions, but some signal loss may be experienced when propagation is unfavorable.

The path between the two lower antennas will typically experience significant obstructions to the Fresnel zone in normal atmospheric conditions, as shown in FIG. 2, so conventionally the lower antenna is not used for transmission.

SUMMARY OF THE INVENTION

In accordance with the present invention an improved method and apparatus is disclosed for increasing the gain in a point to point radio system by the use of spatially diverse antennas on transmission and reception. The system may for example be installed as an upgrade to an existing installation, in which an upper and a lower antenna are present on each antenna tower. In the disclosed system signals are transmitted from two antennas at one station and are received on two antennas at a second station in order to maximize the gain of the link.

A single data stream is used to generate two signals which are transmitted from two antennas. The transmitted signals are received by two antennas and optimally combined. The relative phases of the two signals are adjusted before transmission in order to maximize the gain of the system as seen at the output of the optimal combiner.

A method of accurately adjusting the relative phases of the signals transmitted by two antennas is provided by the insertion of pilot tones into the OFDM signal format. The same data is transmitted from each transmitter, but only a subset of the pilot tones is transmitted from each transmitter, such that if a pilot tone is transmitted from one antenna, the equivalent pilot tone from the other antenna is omitted from the spectrum. At the receiver, the signal received by each antenna is separately transformed by a Fast Fourier Transform (FFT). Each tone at the output of the FFT is combined with the equivalent tone from the other antenna using a maximum ratio combiner. The pilot tones at frequencies known to originate from each of the transmit antennas are used to generate an estimate of the phase difference at the output between the components originating from each antenna. It is known that the maximum gain from the system will result when the two sets of pilot tones are received in phase. This relationship can be set up by communication over the reverse channel to the transmitter in an iterative manner.

The accuracy of the phase estimate for each set of pilot tones can be improved by time averaging over many samples.

The disclosed system provides improved system gain over a conventional system. This arises both from improved antenna gain by using a phased array on both transmit and receive and also by the reduction in fade margin which results from the provision of multiple signal paths which may be decorrelated in terms of scintillation and ducting effects. When one of the paths fades the receiver will optimize the combination of transmissions.

Briefly stated, the invention provides a system and method for improving antenna gain through active phase adjustment of a transmitted signal. In an exemplary embodiment, the signal is transmitted from two or more antennas and the relative phases of the transmissions from each antenna are adjusted before transmission to give optimum gain when received by a system comprising one or more antenna elements and a maximum ratio combiner.

In the disclosed method, the transmitted signal includes two components: a data component, which is common to the transmissions from all the antenna elements, and a phase reference component, which is unique to the transmission from each element. The phase reference components are separated in frequency or time such that each can be received without experiencing interference from the other. On reception, the signal components received by the receive antennas are combined by the use of a maximum ratio combiner. The phase reference signals originating from each transmit antenna are separately received and the phase information is extracted. The phases of the components from each transmit element are compared and commands are sent to the transmitting station by a radio channel to enable an adjustment of the relative phases of the transmitted signals in order that they are received in phase with one another, which is the condition known to optimise the system gain.

On the disclosed system an Orthogonal Frequency Division Multiplexed (OFDM) signal is transmitted from two or more antennas. The relative phases of the transmissions from each antenna are adjusted before transmission to give optimum gain when received by a system including two or more antenna elements and a maximum ratio combiner. The signal includes a data component and a phase reference component. The data component consists of a subset of the subcarriers modulated with the input data, which is common to the transmissions from all the antenna elements. The phase reference component consists of a subset of the subcarriers that are modulated with a predetermined phase and are commonly referred to as pilot tones, which is unique to the transmission from each element. The pilot tones from each transmit antenna are separated in frequency such that each can be received without experiencing interference from the other.

A maximum ratio combiner is provided at the receiving antenna and is able to combine the received signal components. A phase extraction device at the receiving antenna receives the separate pilot tones originating from each transmit antenna and extracts the phase information. A comparator device compares the phases of the components from each transmit element and generates commands that are sent to the transmitting station by a radio channel, for example. The commands received at the transmitting station are applied to a phase adjustment device to enable an adjustment of the relative phases of the transmitted signals. The adjustment of the relative phases permits the transmitted components to be received in phase with one another, which contributes to optimization of the system gain.

The relative phases of dual components of a transmitted signal are adjusted as subsequently described in the disclosed method. As previously discussed the transmitted signal includes a data component and a phase reference component. The data component consists of a subset of the subcarriers modulated with the input data, which is common to the transmissions from all the antenna elements. The phase reference component consists of a subset of the subcarriers that are modulated with a predetermined phase and are commonly referred to as pilot tones, which is unique to the transmission from each element. The pilot tones from each transmit antenna are separated in frequency such that each can be received without experiencing interference from the other.

On reception, the signal components received by the receive antennas are combined by the use of a maximum ratio combiner, the pilot tones originating from each transmit antenna are separately received and the phase information is extracted. The phases of the components from each transmit element are compared and commands are sent to the transmitting station by a radio channel to enable an adjustment of the relative phases of the transmitted signals in order that they are received in phase with one another, which is the condition known to optimize the system gain.

The phase adjustment of the transmitted signal may for example be performed by adjustment of the phase of a local oscillator that is used to convert the frequency of the transmitted signals before transmission to provide gain optimization.

The local oscillator is digitally generated and the phase can be selected from a number of fixed values, thereby simplifying the implementation of the local oscillator and the phase control system to achieve gain optimization.

BRIEF DESCRIPTION OF THE DRAWINGS

The invention may be carried into effect through various embodiments that are now described below by way of example only and with reference to the accompanying figures in which.

DETAILED DESCRIPTION OF THE INVENTION

In accordance with the present invention, communication by radio between two stations using the Orthogonal Frequency Division Multiplexing (OFDM) modulation format is achieved. For simplicity this description is given for transmission of data in one direction only but in practice the technique would also be applied to allow transmission in the reverse direction, typically within a different frequency band.

The OFDM format is well known and described in references available from the International Engineering Consortium, for example.

Figure 1:
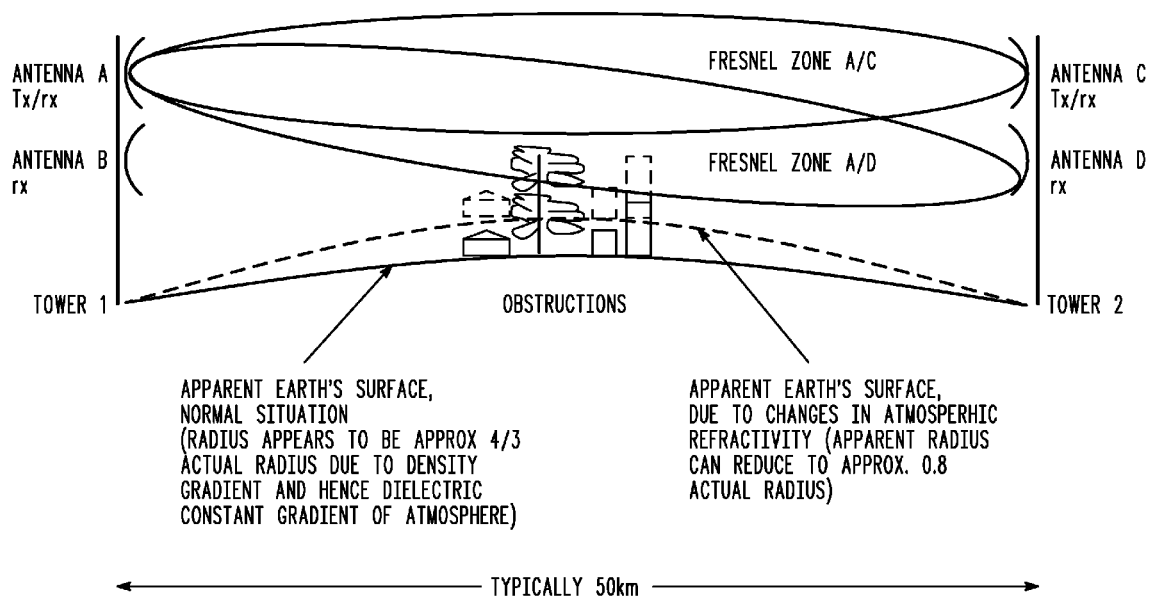
FIG. 1 shows the antenna arrangement of a conventional point to point wireless link showing Fresnel zones for transmissions from Tower 1 to Tower 2.
Figure 2:
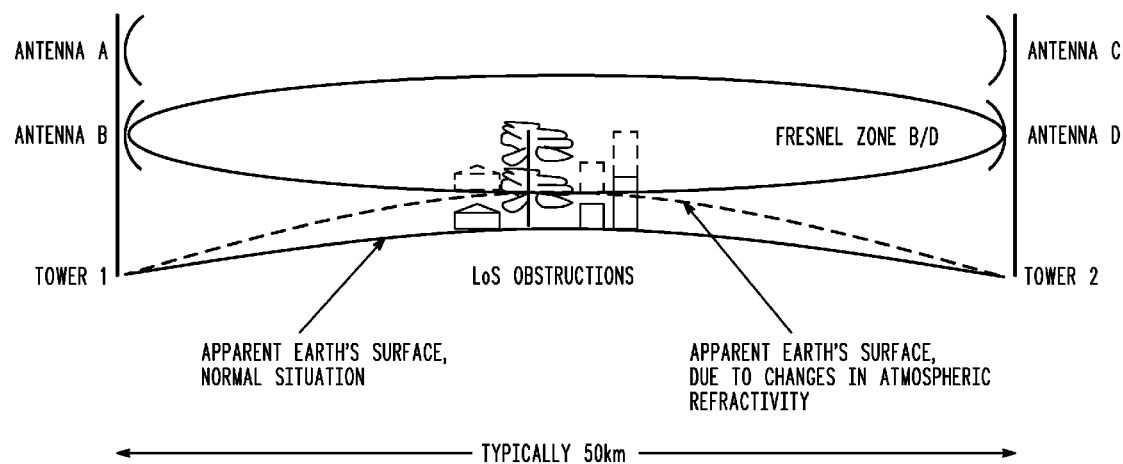
FIG. 2 shows the Fresnel zone for the path B to D showing the obstructed nature of the link which conventionally prevents its use.
Figure 3:
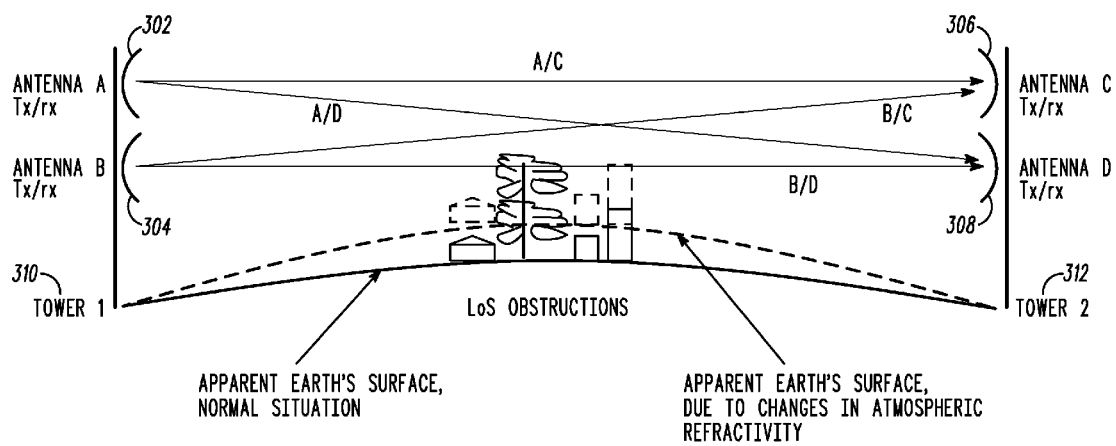
FIG. 3 shows the four possible signal paths resulting from transmitting from two antennas at Tower 1 and receiving on two antennas at Tower 2.

FIG. 3 shows a typical application of the presently disclosed system and method. Directional antennas 302, 304, 306, 308 are mounted on a tower 310 at station 1 and also on a tower 312 at station 2 which may be typically 50 km distant. The system is configured to transmit from two antennas 302, 304 mounted on the first mast and to receive at two antennas 306, 308 on the second mast. The transmitted beam width of each antenna 302, 304 is sufficient to illuminate both receiver antennas 306, 308, and the receiver antennas 306, 308 have sufficient beam width to receive signals from both transmitting antennas 302, 304. As a result, there are four possible line of sight signal paths as shown.

Figure 4:
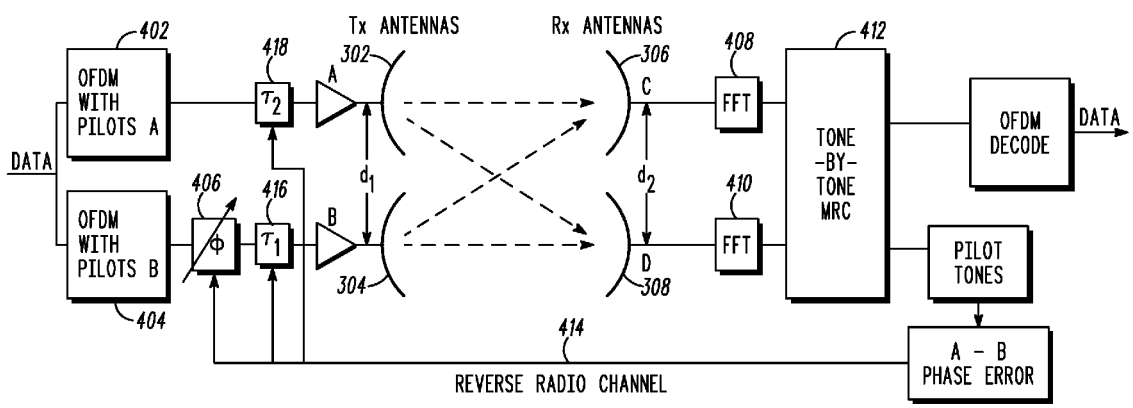
FIG. 4 shows a method of using transmit beamforming and maximum ratio combination.
Figure 5:
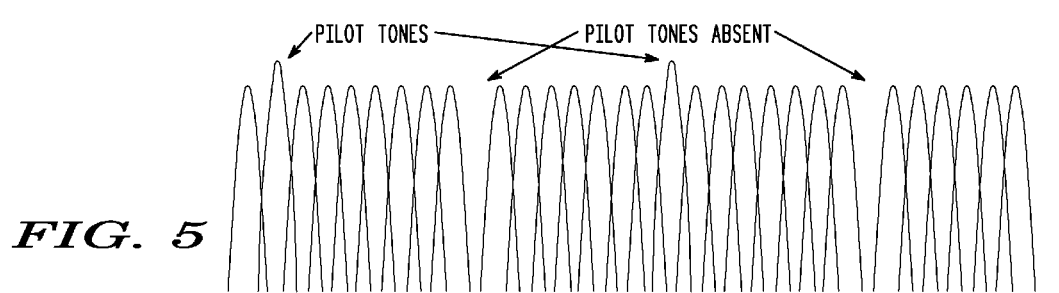
FIG. 5 shows OFDM spectrum transmitted from antenna A.
Figure 6:
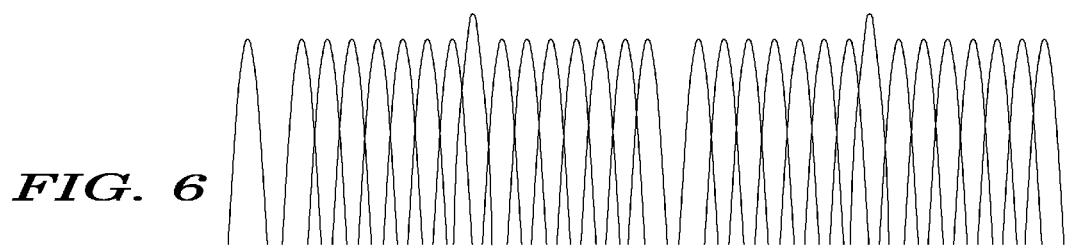
FIG. 6 shows OFDM spectrum transmitted from antenna B.
Figure 7:
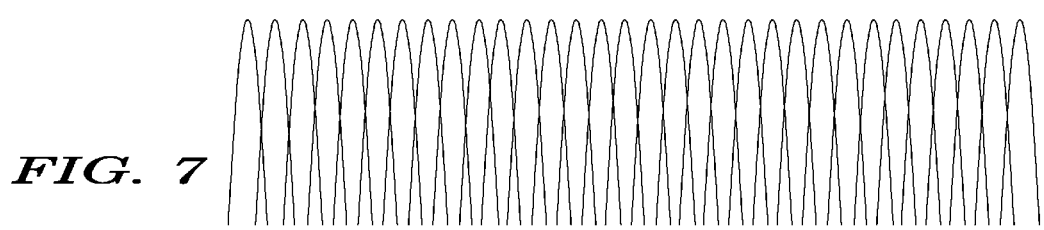
FIG. 7 shows OFDM spectrum received from antennas A and B after maximum ratio combination.

FIG. 4 shows the system in more detail. Data is presented to the input and is used to modulate the sub-carriers on an OFDM waveform. Certain of the OFDM sub-carriers are reserved for use as pilot tones which are transmitted with a predetermined phase to give a reference for decoding the data carried on the OFDM sub-carriers dedicated to carrying data payload. Two sets of symbols are assembled, both of which carry identical data payload but each of which carries only half of the available pilot subcarriers, such that if a pilot subcarrier is present in one set of symbols it is absent on the other set. The frequency spectrum is illustrated in FIGS. 5 and 6. FIG. 5 shows the set of subcarriers transmitted from antenna A 302 and FIG. 6 shows the set of subcarriers transmitted from antenna B 304.

Referring to FIG. 4, it can be seen that the OFDM symbols are separately assembled for channel A 402 and channel B 404. In this example, the phase of the symbols on channel B is adjusted relative to channel A by means of a phase adjustment component. In the one embodiment, the phase adjustment can be performed by adjusting the phase of a local oscillator 406 which is mixed with the signal. The local oscillator 406 and mixer may be in the digital domain so that it may be advantageous in terms of simplified implementation to select the phase of the local oscillator from a small set of options. For example, the local oscillator phase may be set in steps of 90 degrees so that it will be within 45 degrees of the optimum value.

The transmitting antennas 302, 304 and receiving antennas 306, 308 can be an existing arrangement or can be installed specially for this application. The values $d_1$ and $d_2$ in FIG. 4 are not critical for this application; the system will adjust the transmission phases and the maximum ratio combiner 412 in order to optimize the gain within the limitations set by the values of $d_1$ and $d_2$.

The signals received at each antenna 306, 308 are demodulated in the conventional manner for OFDM symbols, by means of a Fast Fourier Transform (FFT) 408, 410. The output bins of the FFT represent the amplitude and phase of each OFDM subcarrier. These FFT outputs are then combined with the equivalent component from the other antenna using a maximum likelihood combiner 412. The pilot tones originating from transmit antenna A 302 are then used to generate an estimate of the transmission phase from antenna A 302 relative to the phase estimate derived from the pilot tones originating from channel B. Feedback is provided by a reverse radio link 414 to the transmitter such that the transmit phase of channel B 404 can be adjusted to minimize the difference of phases on receipt between the signals from channel A 402 and channel B 404. Minimizing the differences between the phases upon receipt contributes to optimizing the gain of the system.

The delay elements $T_1$ 416 and $T_2$ 418 are provided to approximately equalize the delay in the signal paths through the upper and lower antennas. The route to the upper antenna will typically experience a greater delay than that to the lower antenna due to the longer routing cables, in cases where the radio transmitter and receiver are located lower than the antennas, such as when they are located in a building at the bottom of a mast. An additional fine adjustment for the effects of the relative delay can be made by imposing a phase slope with frequency across the transmitted symbols. The phase slope can be applied digitally and adjusted by means of feedback from the receiver by signaling over the reverse radio link 414 such that the phase slopes across the pilots originating at each transmitter are equal. A similar method can be employed to adjust the phase delay elements $T_1$ 416 and $T_2$ 418 also using the reverse radio link.

A system can advantageously be implemented using more than two transmit antennas. If more than two transmit antennas are used, the system allocates groups of pilot tones uniquely to each transmit antenna. The phase of the transmissions from one antenna is arbitrarily treated as a fixed reference value. The transmit phases from the other transmit antennas are adjusted such that the groups of pilot tones are received in phase at the output of the maximum ratio combiner, or at the output of the receiver FFT in the case of a single receive element system.

If more than two receiver antennas are used, the outputs from FFTs performed on the signals received by each antenna are combined using a maximum ratio combiner with an appropriate number of inputs.

What is claimed is:

1. A system for adjusting relative transmission phasing between signals transmitted from a plurality of transmitting antenna elements to at least one receiving antenna element, comprising:

a phase reference having non-overlapping components separated in frequency or time, each component being applied to one of the plurality of transmitting antenna elements along with identical data such that the signals transmitted from different transmitting antenna elements contain the identical data and non-overlapping components;

a signal combining element associated with the at least one receiving antenna element and operable to receive the components and the identical data and extract phase information;

a phase adjustment signaling device for comparing extracted phase information and signaling the plurality of transmitting antenna elements to adjust the relative transmission phasing between the signals transmitted from the plurality of transmitting antenna elements to permit the at least one receiver to receive the transmitted signals with a desired phase relationship;

delay elements disposed in the transmitting antenna elements, the delay elements set to approximately equalize a difference in signal paths to the transmitting antenna elements in addition to a difference in signal paths from the transmitting antenna elements to the at least one receiving antenna element, the phase reference and delay elements are set to maximize constructive interference between transmitted data subcarriers and maximize system gain.

2. The system of claim 1 wherein the non-overlapping components of the phase reference comprise pilot tones that are unique to a transmission from each of the transmitting antenna elements.

3. The system of claim 2 wherein the signal combining element is a maximum ratio combiner and wherein the maximum ratio combiner receives the pilot tones originating from each transmit antenna and extracts the phase information.

4. The system of claim 1 wherein the plurality of transmitting antenna elements and the at least one receiving antenna elements are stationary antenna elements disposed on different towers.

5. The system of claim 1 wherein phase adjustment of the transmitted signal of at least one of the transmitting antenna elements is performed by adjustment of the phase of a local oscillator in the at least one of the transmitting antenna elements, the local oscillator used to convert the frequency of the transmitted signal before transmission to provide gain optimization.

6. The system of claim 1 wherein the transmitting antenna elements are physically co-located, and if the at least one receiving antenna element includes a plurality of receiving antenna elements, the receiving antenna elements are physically co-located.

7. The system of claim 6 wherein the transmitting antenna elements are disposed on a first tower and the receiving antenna elements are disposed on a second tower.

8. A method for adjusting relative transmission phasing between signals transmitted from a plurality of transmitting antenna elements to at least one receiving antenna element, comprising:

generating a phase reference with non-overlapping phase reference components separated in frequency or time;

applying the phase reference to the plurality of transmitting antenna elements such that a phase reference component along with identical data is transmitted from each one of the plurality of transmitting antenna elements to the at least one receiving antenna element;

receiving the identical data and phase reference components and extracting phase information from the phase reference components received at the at least one receiving antenna element;

generating and transmitting phase adjustment information from the at least one receiving antenna element to at least one of the plurality of transmitting antenna elements;

receiving the phase adjustment information at the at least one of the plurality of transmitting antenna elements and adjusting relative transmission phasing between the signals transmitted from the plurality of transmitting antenna elements to obtain a desired phase relationship between the signals transmitted and received at the at least one receiving antenna element;

approximately equalizing a delay caused by the difference in signal paths to the transmitting antenna elements in addition to a delay caused by the difference in signal paths from the transmitting antenna elements to the at least one receiving antenna element, wherein phase information and delay equalization are set to maximize constructive interference between transmitted data subcarriers and maximize system gain.

9. The method of claim 8 wherein the non-overlapping components of the phase reference comprise pilot tones that are unique to a transmission from each of the transmitting antenna elements.

10. The method of claim 8 wherein the relative transmission phasing adjustment is performed by adjustment of the phase of a local oscillator in the at least one of the transmitting antenna elements, the local oscillator used to convert the frequency of the transmitted signal from the at least one of the transmitting antenna elements before transmission to provide gain optimization.

* * * * *